(12) United States Patent
Drozd

(10) Patent No.: US 6,805,324 B2
(45) Date of Patent: Oct. 19, 2004

(54) ALTERNATE METHODS OF PARACHUTE CONSTRUCTION

(75) Inventor: Vladimir Drozd, Fort Erie (CA)

(73) Assignee: Irvin Aerospace Canada Ltd., Belleville (CA)

( * ) Notice: Subject to any disclaimer, the term of this patent is extended or adjusted under 35 U.S.C. 154(b) by 0 days.

(21) Appl. No.: 10/631,517

(22) Filed: Jul. 31, 2003

(65) Prior Publication Data

US 2004/0026568 A1 Feb. 12, 2004

Related U.S. Application Data

(60) Provisional application No. 60/401,687, filed on Aug. 7, 2002.

(51) Int. Cl.$^7$ .............................................. B64D 17/02
(52) U.S. Cl. ..................................................... 244/145
(58) Field of Search ........................... 244/138 R, 142, 244/143, 145, 147, 148, 152, 138 A

(56) References Cited

U.S. PATENT DOCUMENTS

| | | | | |
|---|---|---|---|---|
| 1,562,258 A | * | 11/1925 | Russell ....................... | 244/145 |
| 1,777,441 A | * | 10/1930 | Malmer ..................... | 244/145 |
| 1,862,247 A | * | 6/1932 | Tricau ........................ | 244/145 |
| 1,877,227 A | * | 9/1932 | Cunningham .............. | 244/142 |
| 2,683,575 A | * | 7/1954 | Heinrich ..................... | 244/142 |
| 2,929,588 A | * | 3/1960 | Ewing ........................ | 244/145 |
| 3,136,508 A | * | 6/1964 | Sepp, Jr. ..................... | 244/145 |
| 3,193,222 A | * | 7/1965 | Davies ....................... | 244/145 |
| 3,218,007 A | * | 11/1965 | Gross ......................... | 244/145 |
| 3,298,639 A | * | 1/1967 | Heinrich et al. ........... | 244/145 |
| 3,385,540 A | | 5/1968 | Thomas | |
| 3,393,885 A | * | 7/1968 | Neumark .................... | 244/145 |
| 3,469,805 A | * | 9/1969 | Craig et al. ................ | 244/31 |
| 3,507,467 A | * | 4/1970 | Sepp ........................... | 244/145 |
| 3,612,449 A | * | 10/1971 | Sepp ........................... | 244/145 |
| 3,655,152 A | * | 4/1972 | Bonn et al. ................. | 244/145 |
| 3,690,603 A | * | 9/1972 | Lemoigne ................... | 244/145 |
| 3,809,342 A | * | 5/1974 | Lemoigne ................... | 244/145 |
| 4,065,079 A | * | 12/1977 | Winchurch .................. | 244/152 |
| 4,253,627 A | * | 3/1981 | Matsuo ....................... | 244/145 |
| 4,270,714 A | * | 6/1981 | Jalbert ........................ | 244/145 |
| 4,326,683 A | * | 4/1982 | Uotila ......................... | 244/145 |
| 4,343,448 A | * | 8/1982 | Johnson ...................... | 244/145 |
| 4,588,149 A | | 5/1986 | Gold | |
| 5,037,042 A | * | 8/1991 | Calianno .................... | 244/145 |
| 5,248,117 A | * | 9/1993 | Hennings .................... | 244/152 |
| 5,839,695 A | | 11/1998 | Puskas | |
| 6,003,815 A | * | 12/1999 | Parker et al. ............... | 244/142 |
| 6,328,262 B1 | * | 12/2001 | Sadeck et al. .............. | 244/142 |

FOREIGN PATENT DOCUMENTS

WO          90 05663 A    5/1990

OTHER PUBLICATIONS

European International Search Report, Nov. 6, 2003 European Patent Office—Authorized Officer—Silva D. Oliveir.

* cited by examiner

Primary Examiner—Michael J. Carone
Assistant Examiner—Stephen Holzen
(74) Attorney, Agent, or Firm—Howard M. Ellis

(57) ABSTRACT

A novel parachute and method of manufacturing can be performed quickly and inexpensively. The parachute comprises a canopy having a plurality of gores with interior and exterior sides, and a pocket on the interior side of the gores formed either with folded or gathered or folded and gathered material from the gore. Preferably, each gore is fastened to adjacent gores at two spaced locations to form longitudinal apertures between gores. When the parachute is deployed some air initially passes through the apertures. However, instead of acting as a single unit like a traditional canopy each gore initially inflates separately in the crown region. As the gores become inflated they work together to close the apertures between the gores and trap air as a single unit.

24 Claims, 9 Drawing Sheets

ALTERNATE METHODS OF PARACHUTE CONSTRUCTION

CROSS-REFERENCE TO RELATED APPLICATION

This application claims the benefit of U.S. Provisional Application No. 60/401,687 filed Aug. 7, 2002.

FIELD OF THE INVENTION

This invention relates to a parachute. More specifically it relates to a method for constructing a parachute and the parachute constructed by this method, wherein the parachute can be constructed quickly and at low cost.

BACKGROUND OF THE INVENTION

Parachutes are well known in the art for slowing the decent of object through the atmosphere, typically objects released from aircraft. Known parachutes typically comprise a plurality of gores connected between a plurality of radials. Each radial is then connected to a line secured to the object. These parachutes are costly as the connections between each gore and radial are time consuming. Further, connecting all the gores and radials is complicated by the bulkiness of the parachute as it is built by successively connecting more gores and radials.

The known parachute construction is based on the use of woven fabric-type materials. Inexpensive non-woven fabrics and films cannot be used in the same manner as woven materials. This keeps the costs high when using non-woven materials for parachute construction.

Clearly, then, there is a longfelt need for a low cost parachute that does not require the costly and time consuming construction of known parachutes and can be constructed with low cost materials.

SUMMARY OF THE INVENTION

The present invention broadly comprises a method for the construction of a parachute, and parachutes made by that method. The parachute comprises a plurality of gores. At least one of the gores comprises an inflation pocket.

A general object of the present invention is to provide a parachute that can be manufactured quickly and inexpensively.

A further object of the present invention is to provide a parachute than can be constructed with inexpensive non-woven fabrics or films.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

It should be appreciated that, in the detailed description of the invention which follows, like reference numbers on different drawing views are intended to identify identical structural elements of the invention in the respective views.

Figure 1:
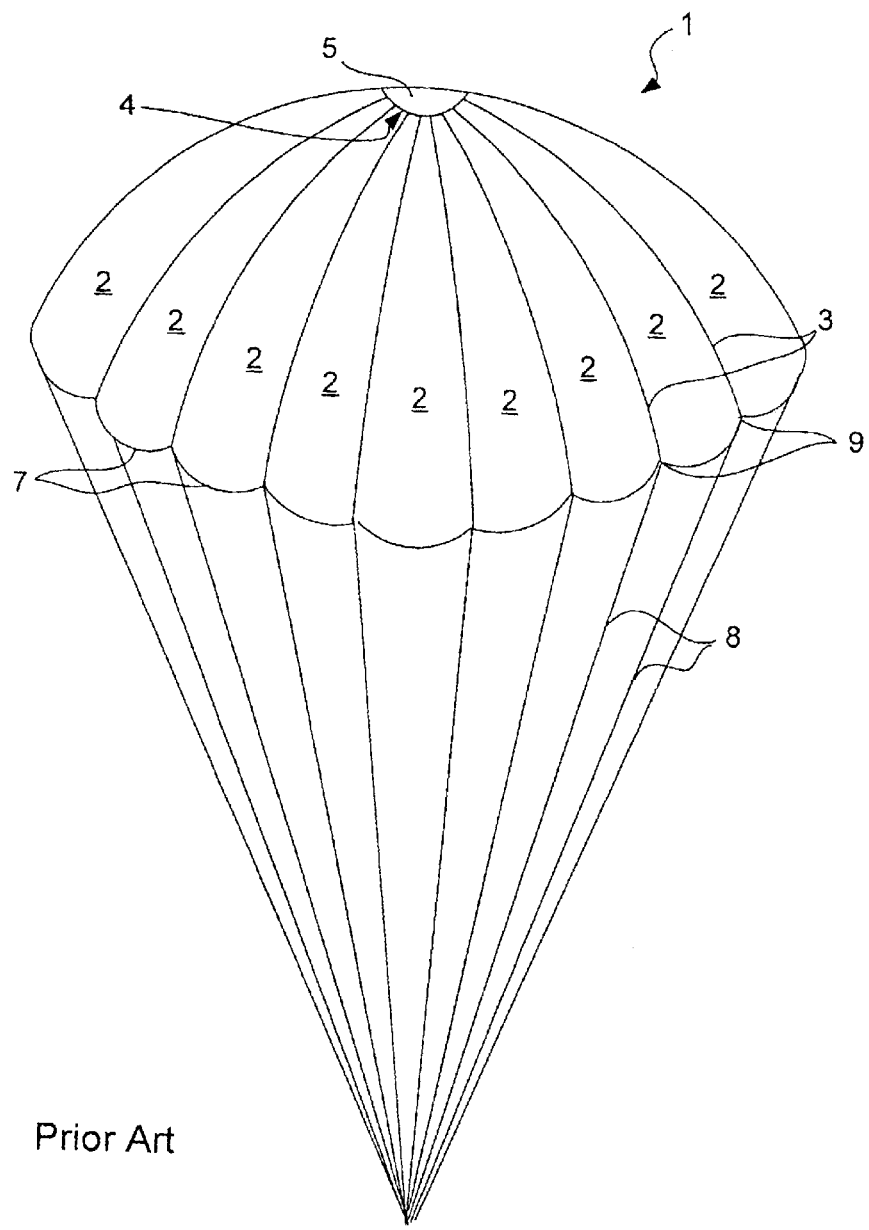
FIG. 1 is a side view of a typical parachute constructed by known methods.
Figure 2:
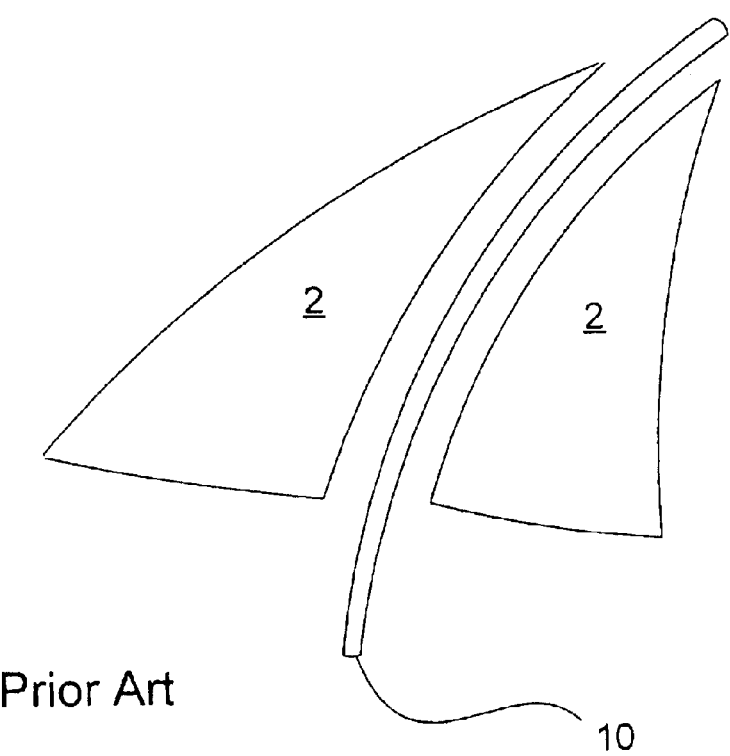
FIG. 2 is a view of a reinforcement strip and two gores of a typical parachute constructed by known methods.

FIG. 1 shows parachute 1 constructed using known methods. Parachute 1 comprises gores 2 and radials 3 brought together at crown 5, and lines 8 connected to the ends of the radials. Radials 3 typically comprise reinforcement strips 10. Each gore typically comprises 3 to 5 panels sewn together for a personnel type sized parachute. The gores are then connected to reinforcement strips 10, as shown in FIG. 2. As each additional gore and strip is attached, the parachute gets bulkier and more difficult to work with. When all the gores are connected together, reinforcement skirt band 7 is then sewn around the perimeter of the canopy and reinforcement vent band 4 is sewn over the crown, requiring additional time and effort. Lines 8 are then connected to the canopy.

Figure 3:
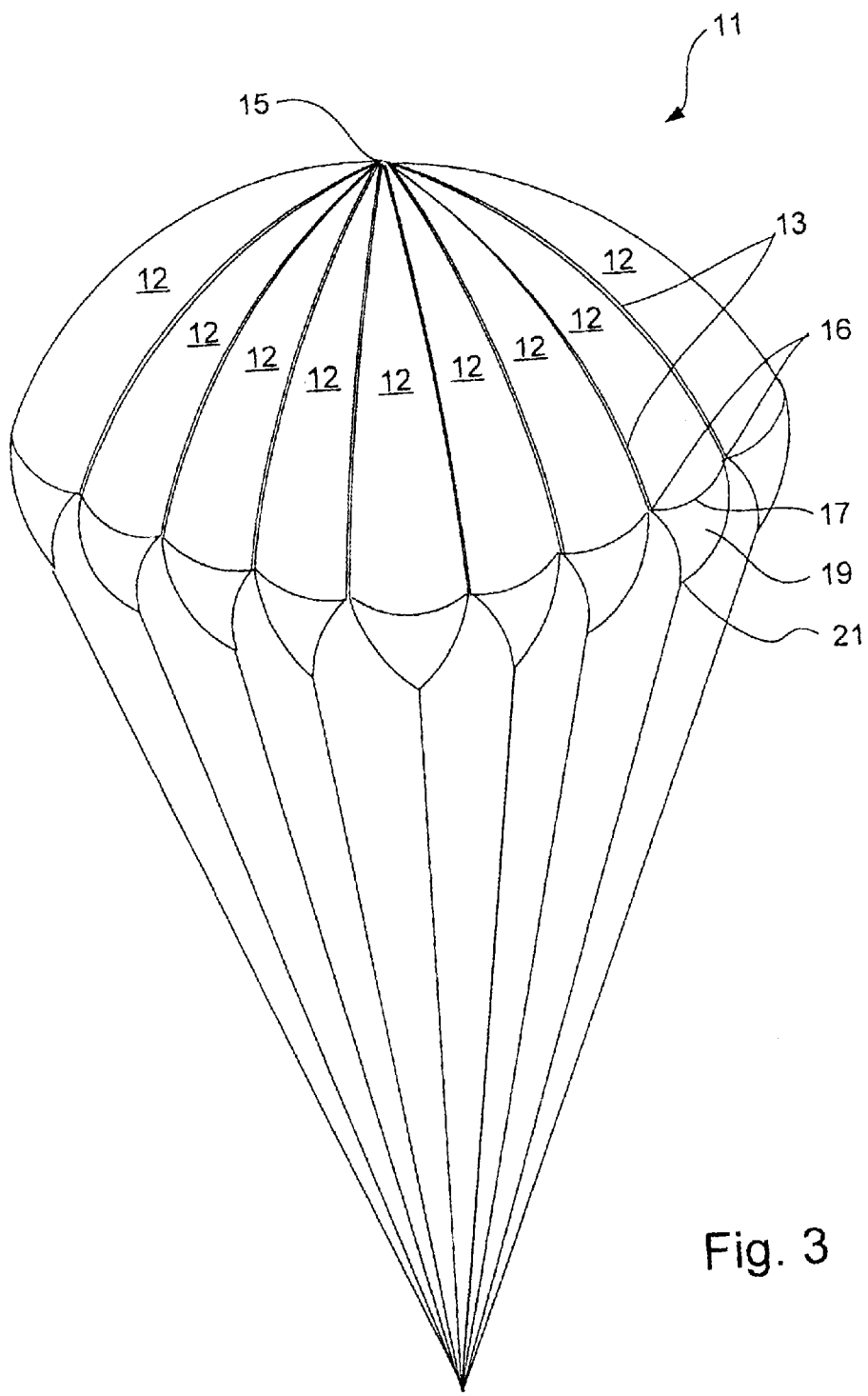
FIG. 3 is a view of an embodiment of the present invention.

FIG. 3 shows an embodiment of the present invention. Parachute 11 comprises gores 12 joined at crown 15. The gores are each connected to the adjacent gore at connections 16. In a preferred embodiment, these two connections, at the crown and at connection 16, are the only connections between the gores. However, it should be readily apparent to one skilled in the art that other configurations of attachments between the gores are possible, and these modifications are intended to be within the spirit and scope of the invention as claimed. Aperture 13 is open from the connections 16 to crown 15. Flare 19 is located at the opposite end of the gore from the crown. The lines are connected to the flares at connection 21. In a preferred embodiment, each gore is made of a single piece of material. However, it should be readily apparent to one skilled in the art that gores can be made of multiple pieces of fabric, and these modifications are intended to be within the spirit and scope of the invention as claimed.

Figure 4:
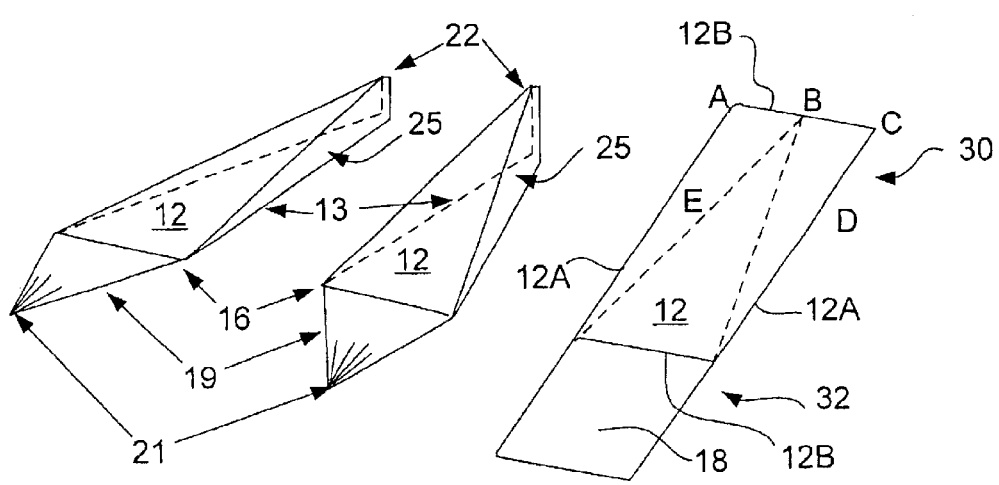
FIG. 4 is a schematic of the construction of a single gore of a first embodiment of the present invention.

FIG. 4 shows the construction of each gore in a first embodiment. First, a rectangular piece of material is cut, having long sides 12A and short sides 12B. (It should be readily apparent to one skilled in the art that non-rectangular gores may be used, and these modifications are within the spirit and scope of the invention as claimed.) The gore is then folded along a line parallel to long sides 12A to bring together points A and C. The seam AC to B is then sealed. This forms inflation pocket 25 at first end 30. At the opposite end 32, the material is collected together to a point 21 to form flare 19. Each individual gore is then connected at points 16 and 22, as shown in FIG. 4. In a preferred embodiment, these are the only two connection points between the gores. However, it should be readily apparent to one skilled in the art that more connections between the gore may be made between these two points to control the inflation rate of the canopy, and these modifications are intended to be within the spirit and scope of the invention as claimed.

Figure 5:
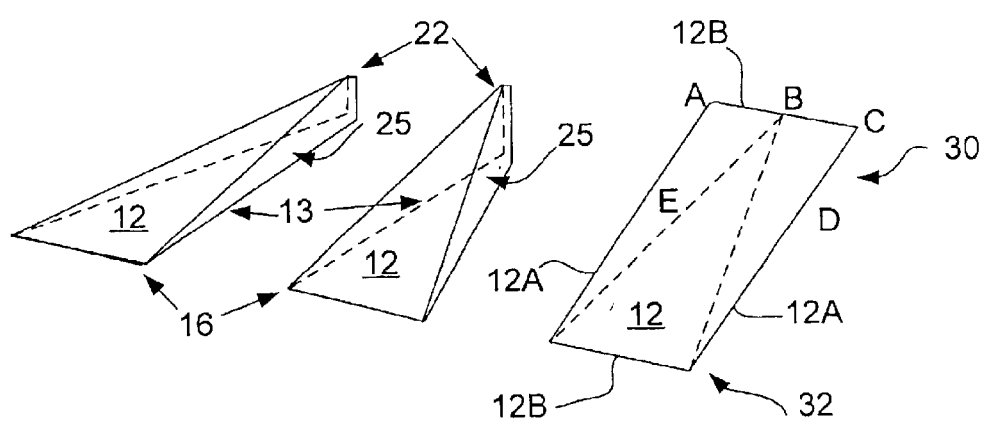
FIG. 5 is a schematic of the construction of a single gore of a second embodiment of the present invention.

The flare 19 is not included in a second embodiment, illustrated in FIG. 5. In this embodiment the gores are connected at points 16 and 22, and the lines may be connected to the gores at connections 16.

Figure 6:
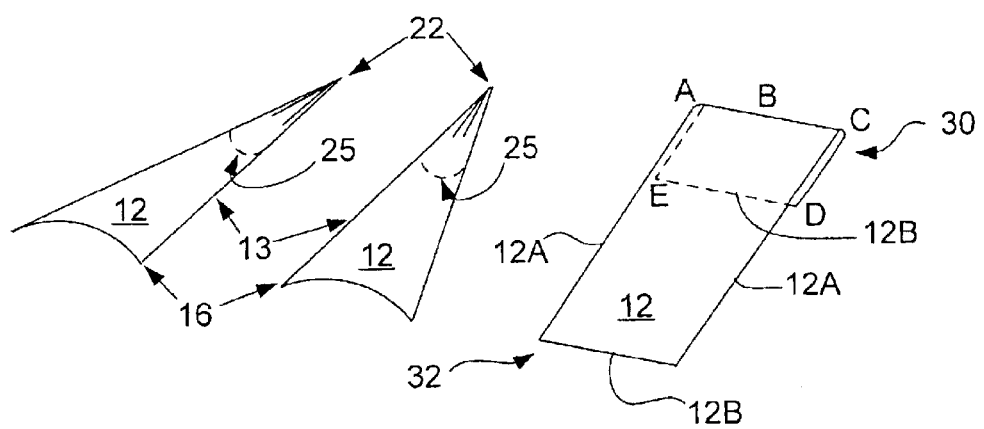
FIG. 6 illustrates a third embodiment of a single gore of the present invention.
Figure 7:
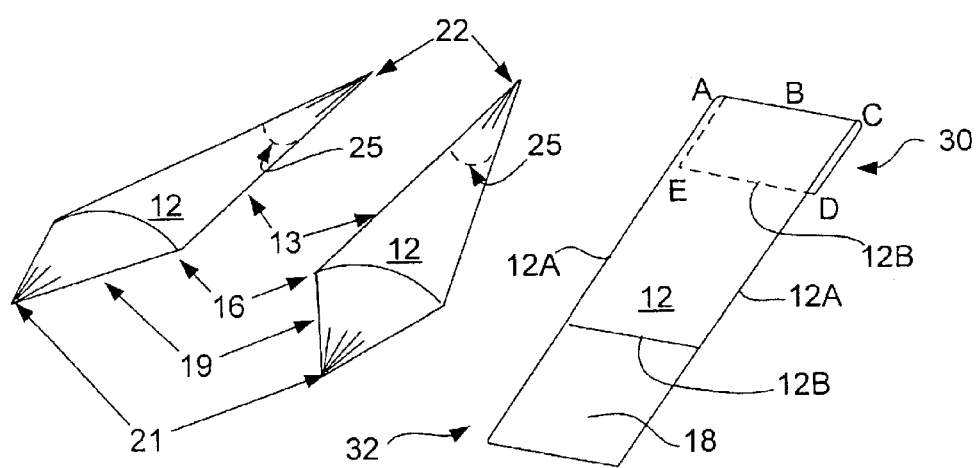
FIG. 7 illustrates a fourth embodiment of a single gore of the present invention.

FIGS. 6 and 7 show third and fourth exemplary embodiments of the gores and inflation pockets of the present invention. Gore 12 with long sides 12A and short sides 12B has a portion of a first end 30 folded over to overlap the gore. The long sides are then sealed along the overlapped portion, forming inflation pocket 25. In a preferred embodiment, the gores are then connected at points 16 and 22. In FIG. 6, the lines may be connected to the connections 16. FIG. 7 shows an embodiment wherein the gores 12 further comprise flares 19. Additional material 18 at second end 32 is gathered to form flare 19. The lines may be connected to the flares 19.

Figure 8:
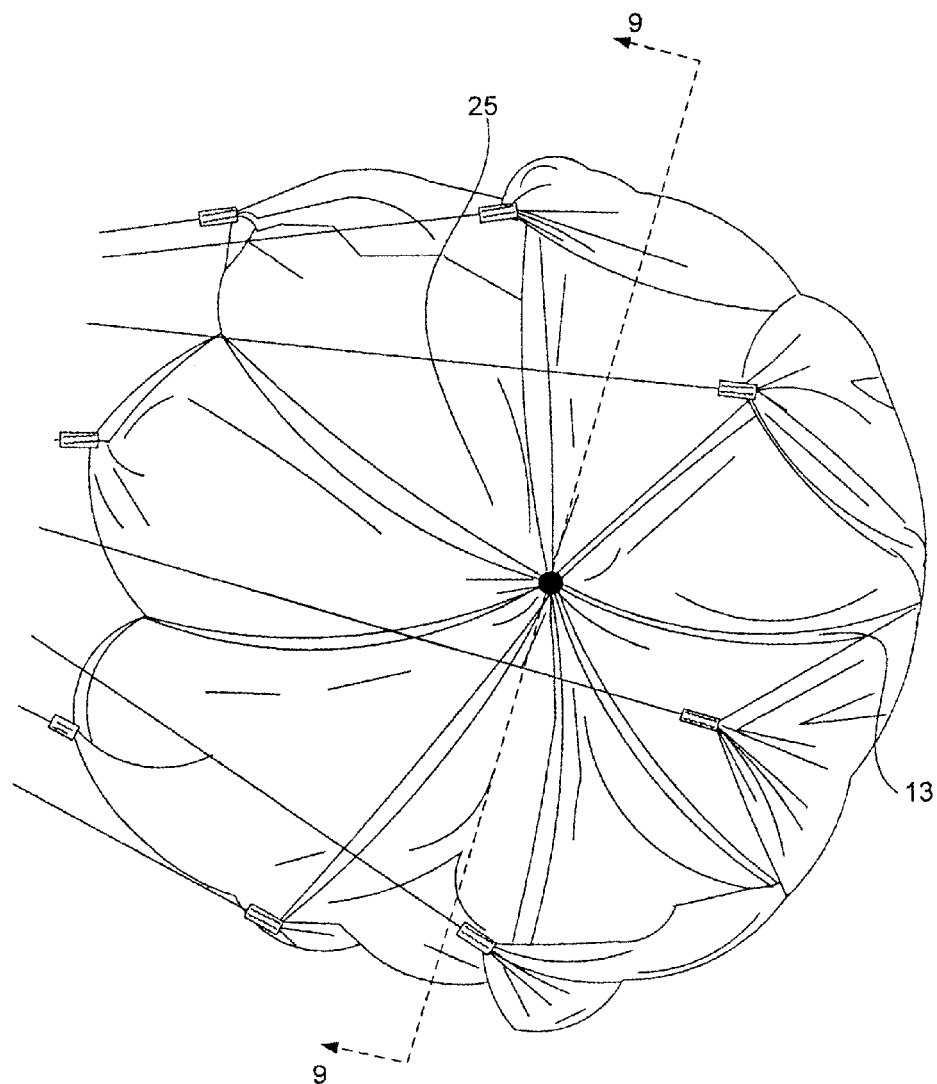
FIG. 8 illustrates an inflated canopy of an embodiment of the present invention; and, FIG. 9 is a cross sectional view of the inflated canopy shown in FIG. 8, taken along line 9—9 in FIG. 8.
Figure 9:
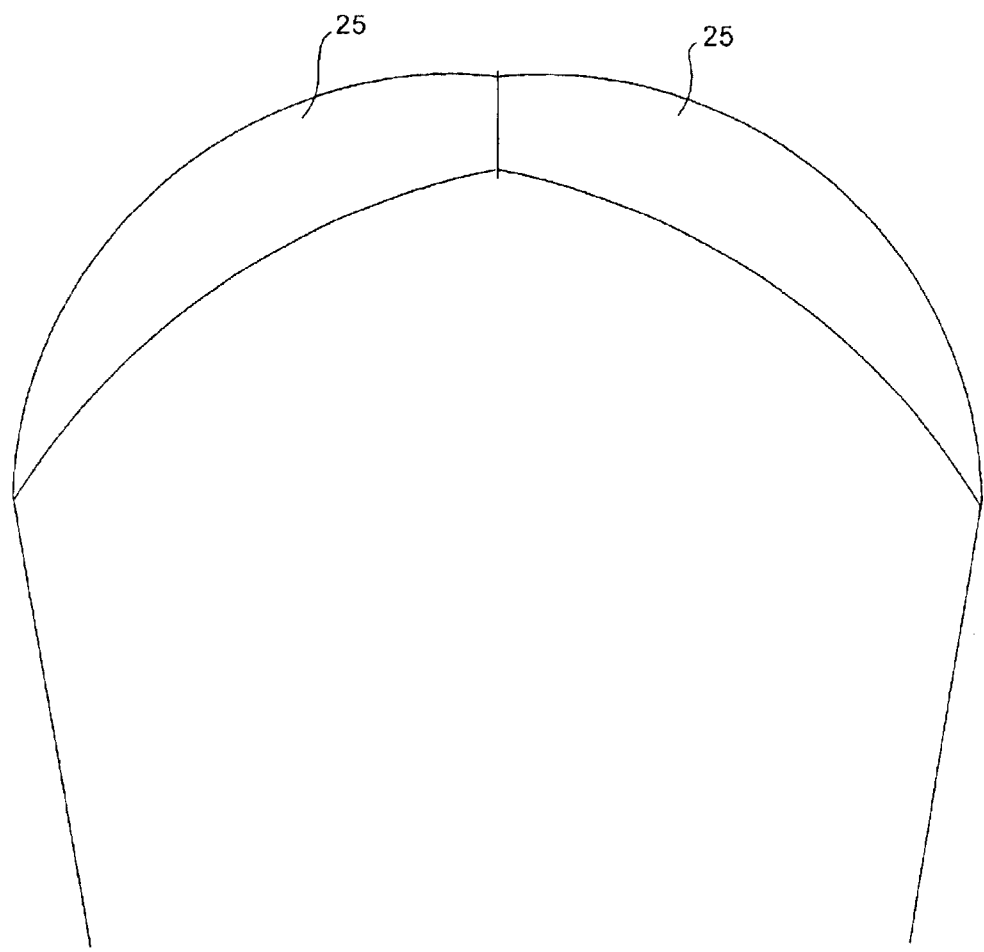

When the present invention is deployed, some air passes through the apertures, which may be open. However, each inflation pocket inflates, which closes the apertures at the crown of the canopy. In this manner, the entire canopy is inflated. FIG. 8 is an illustration of an inflated canopy of an embodiment of the present invention. Inflation pockets 25 are inflated, closing apertures 13. Thus, instead of acting as a single unit like the traditional canopy, each gore at first inflates separately at the crown. Then, as the gores are inflated, they work together to close the apertures and trap air as a single unit. FIG. 9 is a cross sectional view of the inflated canopy shown in FIG. 8, showing the inflation pockets 25.

All of the drawings of the present invention show canopies wherein each of the gores comprises an inflation pocket. However, it should be readily apparent to one skilled in the art that a canopy could be constructed with some gores comprising an inflation pocket and some gores not comprising an inflation pocket. All canopies having at least one gore comprising an inflation pocket are within the spirit and scope of the invention as claimed.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. A method for making a parachute canopy from a suitable gore material comprising the steps of:
    (i) creating a pocket in an interior side of at least one of a plurality of gores having interior and exterior sides by a step selected from the group consisting of folding, gathering and folding and gathering a piece of said gore material;
    (ii) connecting surfaces of said folded, gathered or folded and gathered gore material of a given gore to form said pocket, and
    (iii) connecting said plurality of gores together to form said parachute canopy.

2. The method recited in claim 1, wherein said gores are generally triangular shaped.

3. The method recited in claim 1, wherein said plurality of gores are connected together proximate to said pocket of each of said gores.

4. The method recited in claim 1, wherein each of said plurality of gores comprises a pocket.

5. The method recited in claim 1, wherein said surfaces of said gore material are connected by sealing.

6. The method recited in claim 1, wherein said pocket is generally cone shaped.

7. The method recited in claim 1, wherein each gore is fabricated from a single piece of said gore material.

8. The method recited in claim 1, wherein connections of adjacent gores of the canopy are spaced from one another to form apertures therebetween.

9. The method recited in claim 8, wherein said gores comprise an upper first end, and a lower second end opposite said first end, said method comprising the step of forming a skirt or tapering said lower second end of said gores to form flared ends.

10. The method recited in claim 9, wherein said canopy comprises a crown at said upper first end, and the method includes the step of joining said plurality of gores at least at points in proximity to said crown.

11. A method for making a parachute canopy comprising the steps of:
    folding a plurality of rectangular gores in half parallel to a pair of long sides, each of said gores having two short sides and two long sides;
    sealing a first short side of each of said plurality of gores to form an inflation pocket in each of said gores;
    connecting said plurality of gores together proximate said inflation pockets; and,
    connecting adjacent corners of a second short side of said plurality of gores.

12. A method for making a parachute canopy comprising the steps of:
    folding over an end portion of a first end of a plurality of rectangular gores, said gores comprising two short sides and two long sides, wherein said first end is one of said short sides and a second end is an opposite short side;
    sealing said long sides of said folded over end portion to form an inflation pocket in each of said gores;
    connecting said plurality of gores proximate said inflation pockets; and,
    connecting adjacent corners of said short sides at said second end of said plurality of gores.

13. A parachute, which comprises a canopy having a plurality of connected gores, said gores having interior and exterior sides, and a pocket comprising connected surfaces of said interior side of at least one of said gores, wherein said connected surfaces of said pocket are formed from folded, gathered or folded and gathered material of a given gore.

14. The parachute recited in claim 13, wherein said gores of the canopy are connected to each of two adjacent gores in at least two locations along sides of said gores.

15. The parachute recited in claim 14, wherein the pockets of said gores are generally triangular shaped.

16. The parachute recited in claim 14, wherein said pockets are in the form of a pouch or envelope.

17. The parachute recited in claim 13, wherein each of said gores and pockets are fabricated from a single piece of material.

18. The parachute recited in claim 13, wherein each gore of said canopy further comprises an upper first end, a lower second end opposite said first end, a pocket at said upper first end and a skirt or tapered flare at said lower second end.

19. The parachute recited in claim 18, wherein said canopy comprises a crown at said upper first end of said gores, said gores connected in proximity to said crown.

20. The parachute recited in claim 13, wherein each gore comprises a pocket which is an inflation pocket.

21. The parachute recited in claim 13, wherein said surfaces of said pocket are connected by sealing.

22. A method for making a parachute canopy from a suitable gore material comprising the steps of:
  (i) creating a pocket in an interior side of at least one of a plurality of gores having interior and exterior sides by a step selected from the group consisting of folding, gathering and folding and gathering a piece of said gore material into a plurality of surfaces which together form a polyhedral configuration;
  (ii) connecting said plurality of surfaces of said folded, gathered or folded and gathered piece of gore material to form said pocket, and
  (iii) connecting said plurality of gores together in at least two places along sides of said gores.

23. The method recited in claim 22, wherein the plurality of surfaces of said pocket form a trihedral shaped pocket.

24. A method for making a parachute canopy from a suitable gore material comprising the steps of:
  (i) creating a pocket on an interior side of a plurality of gores having interior and exterior sides, said interior sides of said gores formed into said pocket by a step selected from the group consisting of folding, gathering, and folding and gathering a piece of said gore material for forming a pocket configuration;
  (ii) connecting surfaces of said folded, gathered or folded and gathered gore material of a given gore to form said pocket configuration, and
  (iii) connecting said plurality of gores together wherein each gore is affixed to an adjacent gore at least at two spaced locations.

* * * * *